United States Patent [19]
Martin

[11] 3,858,494
[45] Jan. 7, 1975

[54] COFFEE PERCOLATOR WITH SAFETY DEVICE

[75] Inventor: Wesley G. Martin, Manitowoc, Wis.

[73] Assignee: Aluminum Specialty Company, Manitowoc, Wis.

[22] Filed: Mar. 29, 1973

[21] Appl. No.: 345,882

[52] U.S. Cl. .................................................. 99/312
[51] Int. Cl. ............................................. A23f 1/00
[58] Field of Search ..................... 99/312, 304, 323; 220/24 C, 55 PC, 55 K, 40 R, 42

[56] References Cited
UNITED STATES PATENTS
1,115,872  11/1914  Siebert .................................. 99/304
1,486,064  3/1924  Warren ............................. 220/24 C
3,135,189  6/1961  Jepson ................................. 99/312

Primary Examiner—Harvey C. Hornsby
Assistant Examiner—Robert Pous
Attorney, Agent, or Firm—Edmond T. Patnaude

[57] ABSTRACT

A spring carried by a twist-on type cover for a percolator is compressed against the spreader plate to push the cover away from the top of the percolator vessel to provide a visual indication when the cover is not locked to the vessel.

2 Claims, 6 Drawing Figures

Patented Jan. 7, 1975 3,858,494

COFFEE PERCOLATOR WITH SAFETY DEVICE

The present invention relates in general to coffee percolators, and it relates more particularly to a new and improved percolator incorporating a twist-on cover and associated spring for indicating to the user when the cover is not locked to the percolator vessel.

BACKGROUND OF THE INVENTION

In the past, coffee percolators of the type normally used in the home included a cover which loosely fitted over the top of the percolator vessel. Many serious accidents resulted from such covers accidentally falling off the percolators. Moreover, such prior art percolators commonly employed a removable, transparent glass knob on the cover through which the percolating coffee could be observed. Although these knobs were generally secured to the cover by a bayonet type joint they also fell off on occasion while the hot coffee was being served. Twist locks have since been used with percolator covers, but accidents still occur because those using these newer percolators do not always remember to twist the covers to lock them in place on the vessels.

OBJECTS OF THE INVENTION

Therefore, a principal object of the present invention is to provide a new and improved percolator construction incorporating safety means for decreasing the chances of the cover accidentally falling off the vessel.

Another object of this invention is to provide a percolator including means for positively holding a removable glass knob on the cover.

A further object of this invention is to provide spring means for holding a glass knob on the cover of a percolator and also for indicating when the cover is not secured to the vessel.

SUMMARY OF THE INVENTION

Briefly, the above and further objects may be realized in accordance with the present invention by mounting a coil spring over the bottom end of the glass knob to prevent spurious disassembly thereof from the cover, which spring engages the spreader plate when the cover is placed on the vessel and must be compressed between the spreader plate and the cover when the cover is locked to the percolator vessel. When not locked to the vessel, the cover is held above the rim of the vessel by the spring to provide a visual indication that the cover is not locked to the vessel.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE INVENTION

Figure 1:
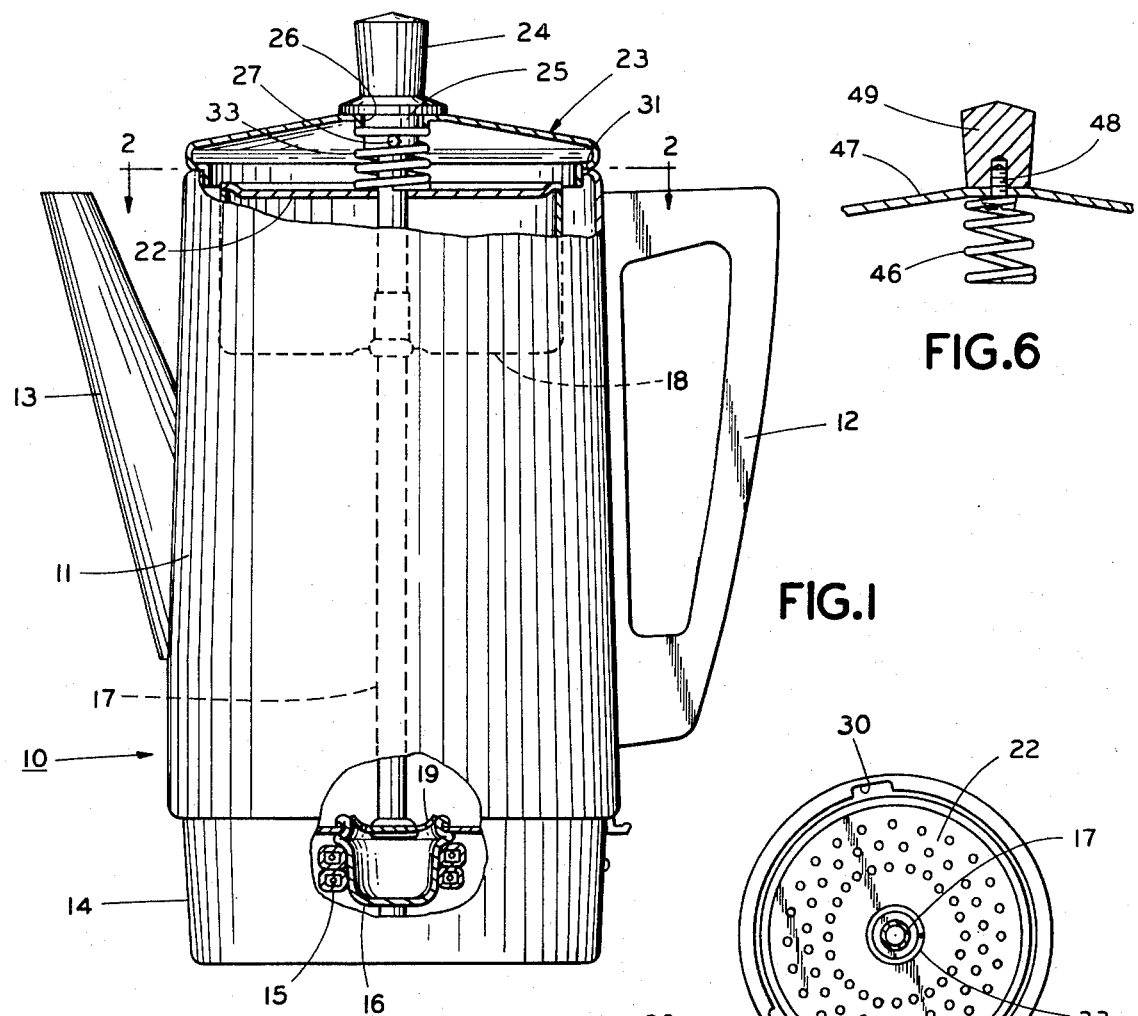
FIG. 1 is an elevational view, partly in section, of a coffee percolator emobodying the present invention.

Referring now to the drawing and particularly to FIG. 1 thereof, there is shown a coffee percolator of the electrically heated type comprising a vessel 11 having secured thereto a handle 12 and a pouring spout 13 disposed opposite the handle. A support housing at the bottom of the percolator encloses an electrical heating coil 15 which surrounds a cup 16 defining a well in the bottom of the vessel 11. A tubular stem 17 supports a coffee grounds basket 18 near the top of the vessel and includes a perforated, pump cap member 19 at the bottom which fits over and partially into the well to support the stem 17 and the basket 18 in place within the vessel 11. A perforated basket cap/or spreader plate 22 is removably fitted over the top of the basket 18 and a cover 23 is positioned on the top of the vessel 11 above the spreader plate 12. As shown, a transparent glass knob 24 has a tubular stem portion 25 depending through a central hole 26 in the cover 23 directly above the upper end of the stem 17. One or more small buttons 27 protrude from the side of the knob 24 below the inner surface of the cover 23.

In use, the water in the vessel 11 drips down through one or more holes in the cap member 19 into the heated well in the cup 16 where it is heated to the boiling point thereby increasing the pressure within the well and forcing the liquid therein up through the stem and into the knob 24 from which it falls onto the spreader plate 22 and then passes through coffee grounds contained in the basket 18.

Figure 2:
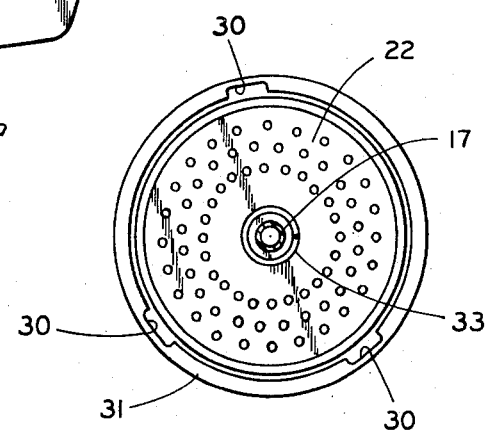
FIG. 2 is a cross-sectional view taken along the line 2—2 of FIG. 1.
Figure 3:
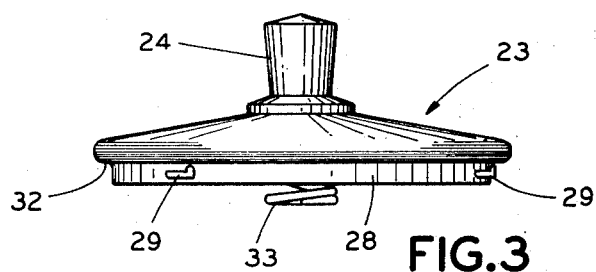
FIG. 3 is an elevational view of the cover of the percolator of FIG. 1 removed from the vessel.

The cover 23, as best shown in FIG. 3, includes a depending annular flange 28 on which is provided a plurality of generally L-shaped locking protrusions 29 which cooperate with a corresponding number of notches 30 (FIG. 2) in the top inturned rim 31 of the vessel 11 to provide bayonet joints for securing the cover 23 to the vessel. Each protrusion includes a horizontal portion which is shorter in length than the notches 30 and a vertical stop portion for limiting the angular rotation of the cover relative to the vessel to facilitate later removal thereof. In use, the cover 23 is placed on the vessel with the horizontal portions of the protrusions 29 positioned in the notches 30 and disposed below the bottom surface of the rim 31. The cover 23 is then given a slight counterclockwise twist to move the horizontal leg portions of the protrusions 29 under the rim of the flange 31 to lock the cover 21 to the vessel.

In order to ensure that the cover 23 has been twisted so as to lock it to the vessel 11, there is provided in accordance with the present invention a coil spring 33 which is affixed as by twisting onto the lower end of the knob 24 over the button 27 thereby to secure the spring 33 to the knob. As best shown in FIG. 1, it will be apparent that with the spring 33 in place, the knob cannot accidentally fall off or be disassembled from the cover 23. However, the spring 33 can be rotated to remove it from the knob to permit removal of the knob from the cover. The spring is sufficiently long that in order to fully insert the cover flange 28 into the vessel 11 so that the locking legs of the protrusions 29 extend below the rim 31, the spring 33 must be compressed against the spreader plate 22. If the cover 23 is not fully inserted into the vessel and twisted into the locked position, the spring 33 holds the cover 23 partially away from the rim 31 so that the cover is tilted and the user can readily see that the cover has not been properly locked in place. An added operating advantage of the spring 33 is that the stem 17 and associated pump cap 19 are held firmly against the base of the vessel so that when percolating is initiated the stem and associated basket and spreader plate do not jiggle up and down and vibrate as is commonly the case with prior art coffee percolators. Also, the upward force exerted on the cover by the spring urges the protrusions 29 against the inner surface of the rim 31 to provide sufficient friction between the protrusions and the rim to insure against spurious untwisting and consequent unlocking of the cover. As shown in the drawing, the spring 33 is axially symmetrical so as to be easily replaced in the correct position after disassembly for cleaning purposes.

Figure 4:
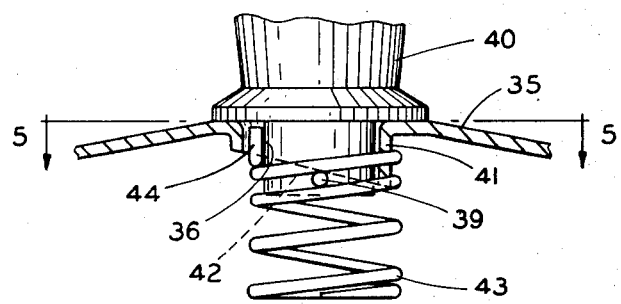
FIG. 4 is a cross-sectional view of another embodiment of the present invention.
Figure 5:
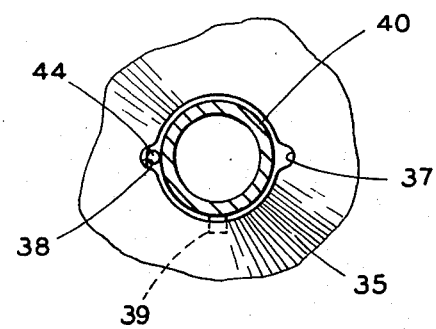
FIG. 5 is a cross-sectional view taken along the line 5—5 of FIG. 4.

Referring to FIGS. 4 and 5, there is shown a coffee percolator cover 35 which is adapted to be locked to an associated vessel by a twist-on type connection such as that employed in the embodiment of the invention shown in FIGS. 1-3. A central knob receiving opening 36 in the cover is provided with a pair of diametrically opposed notches 37 and 38 for receiving a pair of diametrically opposed buttons 39 on the tubular stem portion of the knob 40. The opening 36 is defined by a centrally disposed, generally tubular depending flange portion 41 having a lower surface 42 providing ramps along which the buttons 39 travel to lock the knob in place after it has been inserted with the buttons in the notches 37 and 38 and twisted clockwise. In this embodiment of the invention, a coil spring 43 has an upper end portion 44 extending parallel to the longitudinal axis of the spring, which end portion fits into one of the notches 37 or 38 when the spring 43 is twisted onto the stem of the knob over the buttons 39. This embodiment of the invention provides a more secure attachment of the spring to the knob 40 and thus to the cover 35. Like the spring 33 in the embodiment of FIGS. 1-3, the spring 43 is sufficiently long that it is partially compressed against the spreader plate of the associated percolator when the cover is resting on the upper rim of that percolator.

Figure 6:
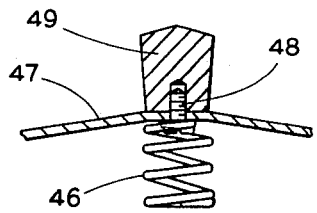
FIG. 6 is a cross-sectional view of still another embodiment of the present invention.

Referring to FIG. 6, there is shown still another alternative embodiment of the invention wherein a coil spring 46 is secured to the inside of a percolator cover 47 by means of a screw 48 which extends through a central aperture in the cover and is threadedly received in a knob 49 on the outside of the cover. The screw 48 thus attaches both the spring and the knob to the cover. In this embodiment of the invention, the spring 46 does not hold the knob 49 on the cover but it is sufficiently long so as to engage the spreader plate of the associated percolator to hold the cover 47 partially away from the upper rim of the percolator vessel unless the cover 47 is locked in place to the rim of the vessel. The locking connection between the cover and the associated vessel is of a twist-on type such as that shown in FIGS. 1-3.

There is thus provided in accordance with the present invention a safety device for indicating to the user of a coffee percolator that the cover has not been locked in place and, moreover, for preventing spurious disassembly of the cover from the vessel after it has been locked in place. In accordance with the embodiment of the invention shown in FIGS. 1 and 4, the same spring which performs this purpose also locks a transparent knob to the cover so as to prevent spurious disassembly thereof.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A coffee percolator of the type including a vessel having an open top, a tubular stem disposed in said vessel, a coffee grounds basket supported on said stem, a perforated spreader plate resting on said basket, and a cover positioned over the open top of said vessel comprising mutually interlocking means on said cover and said vessel for locking said cover to said vessel,
a translucent knob having a tubular portion depending through a central opening in said cover,
a coil spring affixed to the tubular portion of said knob below the inner surface of said cover to maintain said knob assembled to said cover,
said spring depending from the underside of said cover around said stem into engagement with said spreader plate and being compressed against said spreader plate when said cover is locked to said vessel, thereby to lift the cover when the cover and vessel are not interlocked, and
a radial protrusion on said tubular portion of said knob extending between adjacent turns of said coil spring to secure said spring to said knob.

2. A coffee percolator of the type including a vessel having an open top, a tubular stem disposed in said vessel, a coffee grounds basket supported on said stem, a perforated spreader plate resting on said basket, and a cover positioned over the open top of said vessel comprising mutually interlocking means on said cover and said vessel for locking said cover to said vessel,
a translucent knob having a tubular portion depending through a central opening in said cover,
a coil spring affixed to the tubular portion of said knob below the inner surface of said cover to maintain said knob assembled to said cover,
said spring depending from the underside of said cover around said stem into engagement with said spreader plate and being compressed against said spreader plate when said cover is locked to said vessel, thereby to lift the cover when the cover and vessel are not interlocked,
a radial protrusion on said tubular portion of said knob extending between adjacent turns of said coil spring to secure said spring to said knob,
said cover being provided with a notch opening onto said opening for receiving said protrusion, and
the upper end of said spring being bent upwardly in substantial parallel relationship with the longitudinal axis of said spring and extending into said notch.

* * * * *